Feb. 11, 1958 F. HASELOFF 2,822,751

APPARATUS FOR PRINTING VOUCHERS, TICKETS AND THE LIKE

Filed May 23, 1955 3 Sheets-Sheet 1

Inventor:

FRITZ HASELOFF

By Toulmin & Toulmin

Attorneys

Inventor:
FRITZ HASELOFF
By Toulmin & Toulmin
Attorneys

Feb. 11, 1958 F. HASELOFF 2,822,751
APPARATUS FOR PRINTING VOUCHERS, TICKETS AND THE LIKE
Filed May 23, 1955 3 Sheets-Sheet 3
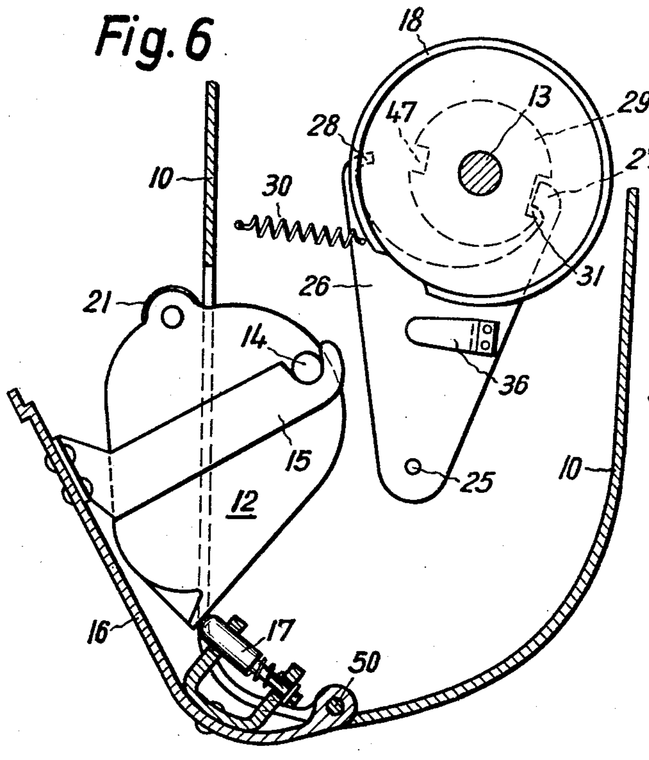
Fig. 7
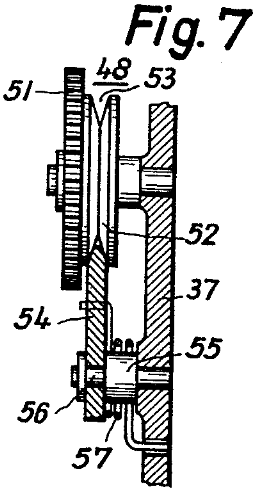
Fig. 3
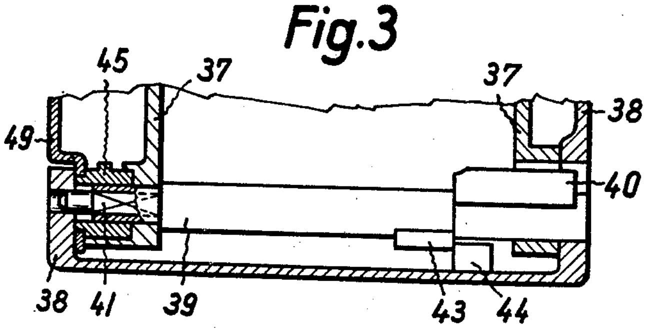
Fig. 4
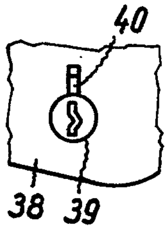
Fig. 5
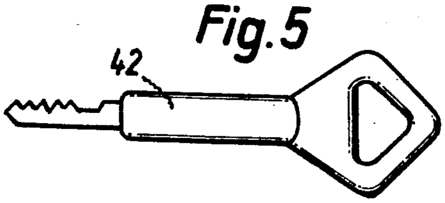
Inventor:
FRITZ HASALOFF
By Toulmin & Toulmin
Attorneys 2,822,751

APPARATUS FOR PRINTING VOUCHERS, TICKETS AND THE LIKE

Fritz Haseloff, Kassel, Germany, assignor to Licentia Patent-Verwaltungs-G. m. b. H., Hamburg, Germany Application May 23, 1955, Serial No. 510,113

Claims priority, application Germany October 1, 1948

3 Claims. (Cl. 101—66)

This invention relates to apparatus for printing vouchers, tickets and the like, and particularly apparatus for printing and issuing tickets which, by means of a printing roller, prints the ticket, and also prints concurrently portions of the ticket text on a separate record strip for accounting purposes and the like.

It is known to provide the record strip in such apparatus in a special box which is accommodated inside the printing apparatus and, when in use, is moved towards the printing roller of the apparatus. The record strip is moved past the roller either by the printing operation itself, or by a pawl and ratchet mechanism on which the printing roller acts. It is further known to provide in each record box for the strip a strip control member, which, by means of transmission members, actuates a locking device in the printing apparatus when the strip breaks or is torn. The printing apparatus is locked in the same manner when the record box is taken out of the printing apparatus.

Several replaceable record boxes have to be provided for each printing apparatus for each shift in which any access to the record strip must be prevented. Thus, if it occurs during the operation of the printing apparatus that a record strip breaks, the attendant, for instance the employee selling the tickets, must be able to rapidly remove the entire box containing the record strip from the printing apparatus, and replace the same by an unused box.

In order to prevent any access to the record strip in the box when the latter is taken out of the printing apparatus, the record box closures have hitherto been sealed in a conventional manner, for instance by means of leads.

However, it is possible that the sealing may be forgotten or omitted due to its intricacy, or due to carelessness. It became then possible for an unauthorised person to tamper with the recorded strip.

It is an object of the invention to provide a record box for use with printing apparatus of the kind described, which box is sealed, for instance by locking together several parts forming the record box casing, by means of a safety lock and key, during operation as well as when the box is removed from the printing apparatus.

It is another object of the invention to provide the above-mentioned record box in a printing apparatus, wherein a locking device is provided for the record strip printing means, which locking device is effective when the record strip is used up or breaks.

According to the invention, these objects are attained by providing the printing machine with interchangeable record boxes containing record strips, and with a locking device for the printing roller cooperating with the aforesaid record box, which locking device is effective on exhaustion or breakage of the record strip, in which the record box casing, consisting of two parts that may be locked together, is provided with a lock which may be operated by hand and is coupled to a strip tear control member and to the printing roller locking device in such a manner that the locking device maintains the printing roller of the printing apparatus locked when the record box is not inserted in the apparatus, and unlocks the printing roller to enable the printing apparatus to be operated when the record box is inserted.

One construction of apparatus according to the invention is illustrated, by way of example only, in the accompanying drawings, wherein:

Figure 3 is a longitudinal section of the part of the record box housing containing the safety lock;

Figure 4 is a front view of the record box housing showing the keyhole for the safety lock shown in Figure 3, and Figure 5 is a view of the corresponding key.

Figure 6 is a similar view to that shown in Figure 1, with the record box in top view and the flap of the apparatus housing half open.

Figure 7 is an enlarged cross-sectional view along line VII—VII of a part of Figure 2, showing part of the transmission means for the recording strip and a locking device for the transmission means, preventing withdrawal of the printed portion of the strip from the record box while the latter is closed.

Figure 1:
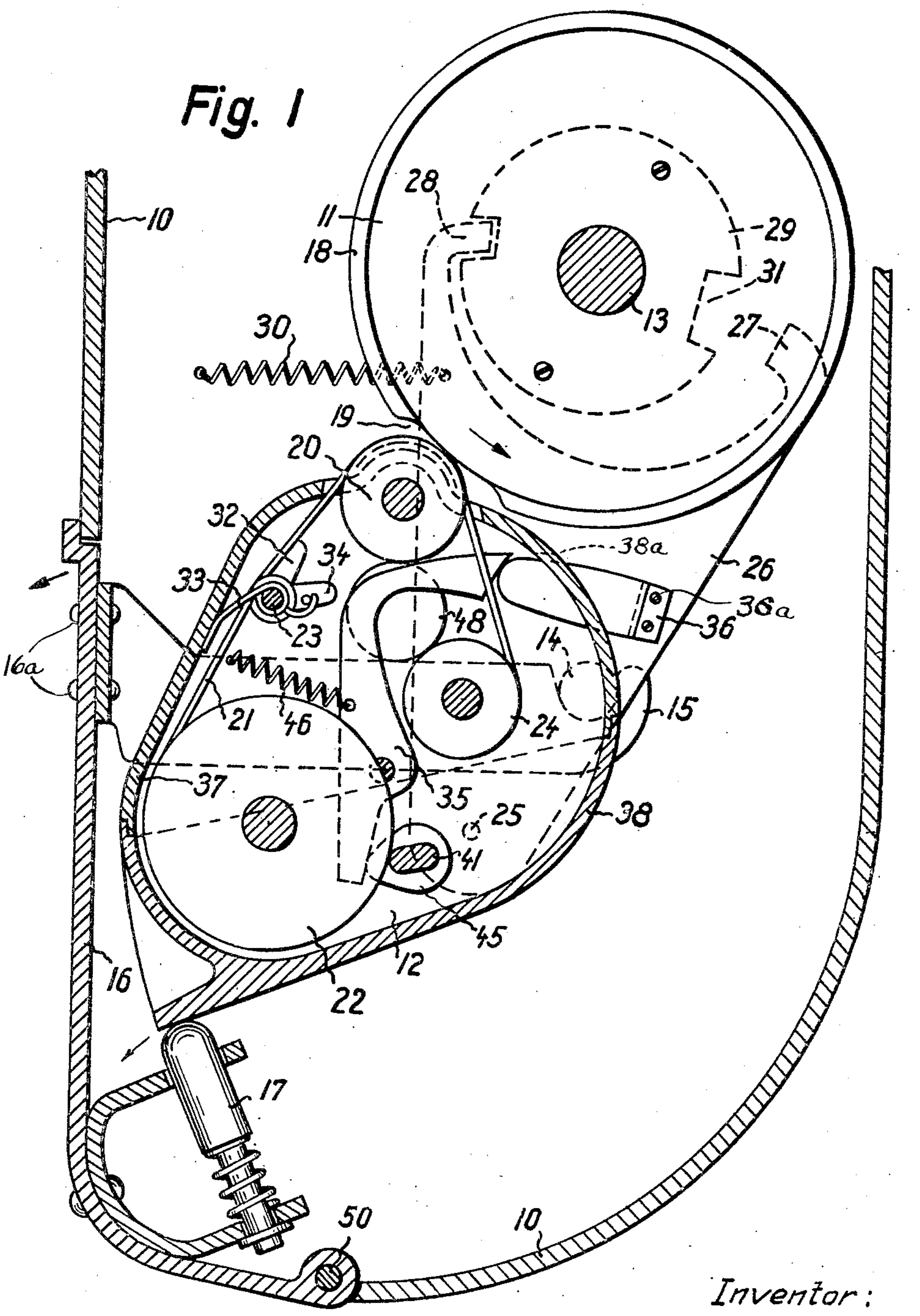
Figure 1 is a cross section of the record box according to the invention inserted in the printing apparatus, of which only the printing roller is shown, the record box being in unlocked condition.

Referring now to the drawings more in detail, inside the housing of a voucher printing apparatus, of which only portions of the housing sidewall 10 is shown in the drawings, are provided two main parts, namely the printing roller 11 which is mounted on a shaft 13, and the record box 12 which is mounted by means of a pin 14 received in slots formed at the end of supporting arms 15 mounted on the closing flap 16 by means of rivets 16*a*, which flap is in turn, hingedly mounted at 50 in the housing of the apparatus, and covers the record box.

When the flap 16 is closed, the record box 12 is always pressed towards the control ring 18 of the printing roller 11 by means of resilient pressure members 17. If part of the text on the printing roller is to be copied for accounting or other recording purposes, the control ring 18 is provided at this position with notches 19, which enable the counter printing roller 20 and the record strip 21 moving over it, to be pressed against the printing block. The recording strip 21 is for this purpose provided on the unwinding roller 22 which rotates in the direction indicated by an arrow therein, and passes through the strip control member 23, and the pressure or counter printing roller 20 to the winding roller 24. The winding roller 24 is driven by the counter printing roller 20 by an interposed friction coupling indicated in the drawing by an intermediary roller 48.

Figure 2:
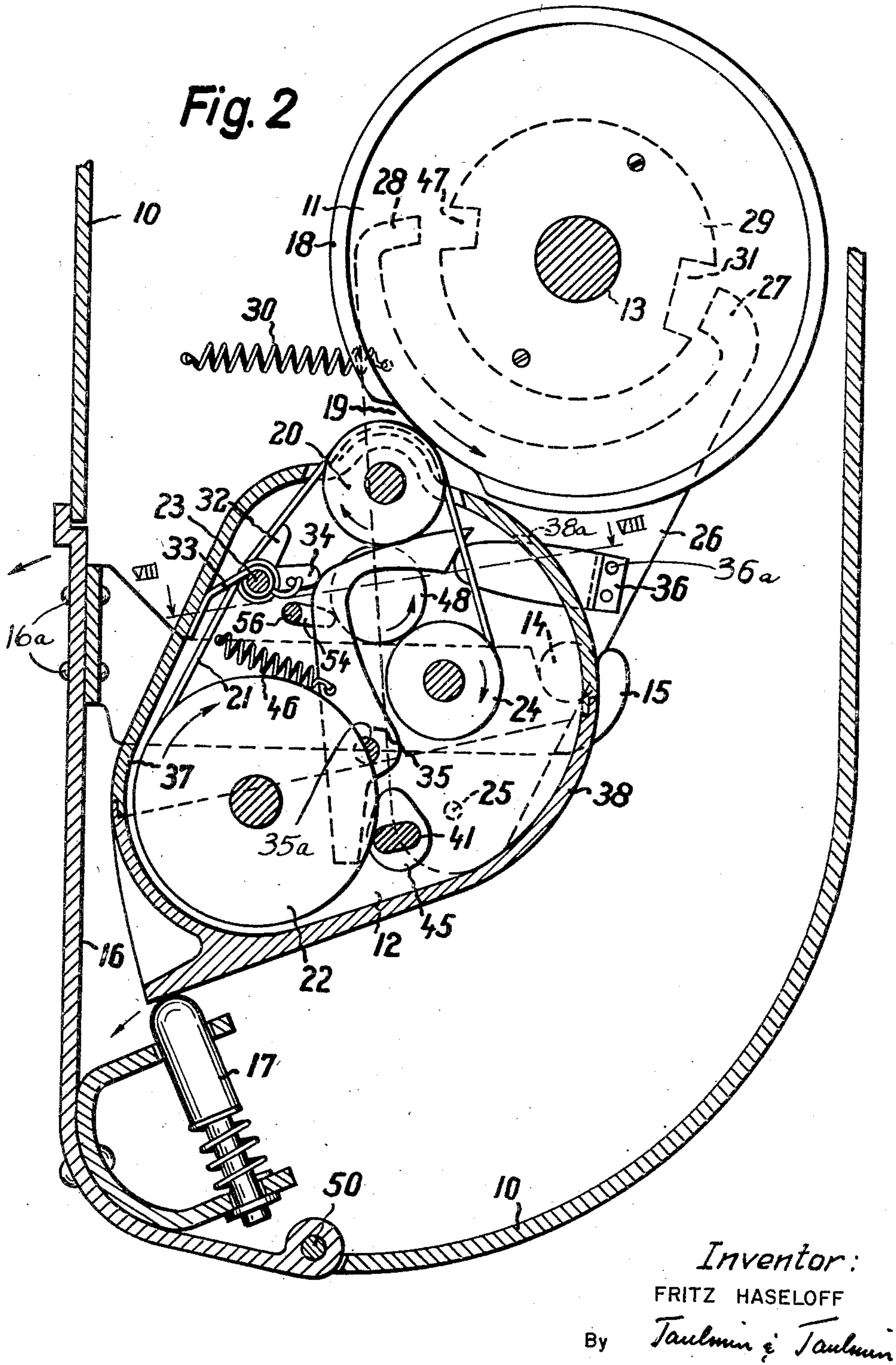
Figure 2 is a similar view as the one shown in Figure 1, with the record box being locked and the printing roller released.

Locking means which may consist of a safety catch are illustrated schematically at 54 and 56 in Figure 2, and will be explained in detail hereinafter in connection with Figure 7. This safety catch prevents the recording strip 21 from being unwound from roller 24 in the direction opposite to the one indicated by an arrow therein, and thus prevents the recorded part of the strip from being drawn out of the record box through the opening therein next to the roller 20.

The locking device of the printing roller 11 consists of a locking member 26 mounted on the pivot 25, which member can engage alternately the locking disk 29 mounted on shaft 13 of the printer 11 by means of two projections 27 and 28, respectively received in slots 31 and 47 of disk 29. As illustrated in Figure 2, the projections 27, 28 are kept out of engagement by a tension spring 30 as long as (1) the record box 12 is inserted,
(2) the record strip 21 is not torn or exhausted, and
(3) the record box is locked by means of the safety lock and key described in detail hereinafter.

These three different functions are achieved by the arrangement of parts according to the invention, with the aid of a feeler 36, which is rigidly secured, for instance by means of a pair of screws 36a, on the locking member 26, and protrudes into the interior of the record box 12 through a slot 38a in the peripheral wall part of casing part 37.

This feeler 36 is urged into the box interior by the aforesaid spring 30 acting on member 26, and cooperates with a contact lever 35.

In each case where feeler 36 does not meet with any resistance from contact lever 35, the aforesaid spring 30 pulls the member 26 to the left, and the projection 27 engages on the right hand in the notch 31 of disk 29.

This always happens, if the record box 12 is not in correct position for printing relative to the printing roller 11, for instance if it is removed from the apparatus.

Figure 6 illustrates this case, in which the flap 16 of the apparatus, on the interior side of which the record box is attached as shown, is in half opened position. Feeler 36 of locking member 26 is not contacting contact lever 35 in the record box and, consequently, spring 30 may pull member 26 to the left as just explained, and make printing roller 11 inoperative.

The same occurs in the case of the strip control member 23, part of which, the member 32, is urged against the record strip 21 by the torsion spring 33. When the strip tears or runs off, the tongue 34, which is rigidly connected to the member 32 and forms part of the strip control member, no longer supports the contact lever 35 which is then swivelled to the left about its pivot 35a together with the cooperating feeler 36.

In addition, the control lock for the record box acts also on this locking device. For this purpose, the box 12 consists of a box casing part 37 and a box casing part 38 as shown in Figure 3. A cover plate 49 forms the backwall of the record box 12 and covers those parts of the record box mechanism that are not enclosed between parts 37 and 38.

The latter two parts are held together by a locking bar 39, which forms part of the safety lock of the record box, which bar bears at one end the key-and-hole lock mechanism 40, and at the other end a two-edged member 41. Parts 37 and 38 are locked together by means of the key 42 shown in Figure 5, which key rotates the bar 39 and the two-edged member 41 in relation to the lock 40, the locking key-bit 43 thus being moved behind the lug 44. As the two-edged member 41 engages in a locking cam 45 provided in the record box, the cam is rotated with the bar 39 either into the locked position of the printing roller as shown in Figure 1, or into the unlocked position of the printing roller as shown in Figure 2. In the unlocked position of the printing roller, the two parts of the record box casing, 37 and 38, are locked together. If the length of paper 21 has run off or been torn, the strip control member is rotated by the torsion spring 33, and the cam tappet 45 allows the ocntact lever 35 to move under the action of a tension spring 46 so that the printing roller 11 can be locked by the keeper 26, and the operation of the printing roller be interrupted. In the locked position illustrated in Figure 1, which also occurs when the locking bar 39 is rotated to open the lock, the locking cam 45, through the transmitting members, namely the lever 35 and the co-operating feeler 36, moves the locking member 26 to engage with its protrusion 28, the left hand notch 47 provided in the locking disk 29 of the printing roller 11, thus preventing operation of the latter.

As has been mentioned above the recording strip 21 must not be accessible to unauthorized persons.

Therefore, the record box 12 is locked on all sides except for the opening in the box casing through which counter printing roller 20 protrudes to the outside thereof. In order to prevent that the portion of the recording strip 21 which has already been printed on and is wound up on winding roller 20, can be pulled out through the aforesaid opening after the box 12 has been removed from the apparatus, the above-mentioned safety catch device is provided to prevent an unwinding rotation of roller 24 in the sense opposite to the arrow shown in roller 24.

This safety catch engages preferably the intermediary roller 48 and is illustrated in Figure 7. It comprises the intermediary roller 48, the part of which in contact with rollers 20 and 24 is, in this illustrated example, a cog wheel 51, and which is mounted rotatably in the box casing part 37. It further comprises a disc 52 rigidly connected with said wheel 51 for rotation therewith and provided with a circumferential groove 53. A pawl 54 is mounted pivotably on a shaft 56 in the same casing part 37 and is urged by a spring 57 mounted about a collar 55 into engagement with the aforesaid groove 53 of disc 52. Figure 2 shows that the angle between disc 52 and pawl 54 is such that, when the former and together therewith the wheel 51 are rotated against the direction of the arrow in 48 (Figure 2) the point of pawl 54 is clamped in groove 53 and such rotation is prevented.

It will be understood that this invention is susceptible to further modification, and, accordingly, it is desired to comprehend such modifications within this invention as may fall within the scope of the appended claims.

What is claimed is:

1. In an apparatus for printing vouchers, tickets and the like, having a housing, a printing roller, and a lockable record box, removably arranged in said housing, and movable to and from cooperative engagement with the printing roller, said record box comprising at least two parts forming the box casing and adapted to be locked together, and a recording strip in said record box, said printing roller being adapted to print a text on the recording strip; the improvement, in combination, of roller locking means in said housing, for locking the printing roller so as to prevent its operation; box locking means for locking said box casing parts together, and comprising tappet means; a shiftable strip control device in said record box adapted for being tensioned by said recording strip passing thereover, and shiftable upon rupture or exhaustion of the latter, and contact lever means in said record box, cooperating, on the one hand, with said tappet means of said box locking means and with said strip control device, and, on the other hand, with said roller locking means; said roller locking means being actuated by way of said contact lever means to lock said printing roller in inoperative position, firstly, when the casing parts of said record box are unlocked by turning said box locking means and said tappet means therewith, the latter thereby shifting said contact lever means, relative to said roller locking means, secondly, when said strip control device is shifted from cooperation with said contact lever means upon the interruption of tension thereon due to rupture or exhaustion of the recording strip, and, thirdly, when said record box and said contact lever means therewith, are removed out of said housing and from cooperative engagement with said printing roller, and said roller locking means, respectively.

2. The improvement as described in claim 1, wherein said roller locking means comprise engaging means attached to said printing roller and having a first and a second recess, a locking member being pivotally mounted on said record box and having at its free end two projections adapted each for engaging one of said recesses in said engaging means, and spring means for urging said locking member with one of its projections into engagement with one of said recesses, said contact lever means holding said locking member with its two projections out of engagement with said engaging means during uninterrupted feeding of said record strip past said printing roller, said contact lever means causing said locking member to engage with one of said projections one of said recess of said engaging means upon exhaustion or rupture of the recording strip as well as upon removal of said record box from cooperative engagement with said printing roller, and causing said locking member to engage with its other projection the other recess of said engaging means upon turning of said box locking means to unlock said casing parts of said box.

3. In an apparatus for printing vouchers, tickets and the like, having a housing, a printing roller, and a lockable record box, removably arranged in said housing, and movable to and from cooperative engagement with the printing roller, said record box comprising at least two parts forming the box casing and adapted to be locked together, a recording strip in said record box, said printing roller being adapted to print a text on the recording strip; locking means for locking said printing roller, and box locking means for locking said box casing parts together, in the manner described; the combination of feeler means associated with said roller locking means protruding into the interior of said record box, a shiftable strip control device in said record box, being tensioned by said recording strip, tappet means pivotably associated with said box locking means and turnable therewith, a contact lever having a first and second arm and being pivotably mounted about a fulcrum intermediate said first and second arm, said first arm being hook-shaped, the tip of said first arm adapted for cooperation with said feeler means, the outer curved portion of said hook-shaped arm contacting said shiftable strip control device, when the latter is tensioned by said recording strip, the end of said second arm engaging said tappet means when said box locking means are turned to lock said box casing parts together; and spring means attached to said first arm and urging said contact lever away from said feeler means and into contact with said shiftable strip control device.

References Cited in the file of this patent

UNITED STATES PATENTS

| | | |
|---|---|---|
| 1,875,117 | O'Connor | Aug. 30, 1932 |
| 1,905,659 | Thomson | Apr. 25, 1933 |
| 1,949,744 | Horn | Mar. 6, 1934 |
| 1,963,205 | Lawrence | June 19, 1934 |
| 2,044,367 | Purdy | June 16, 1936 |
| 2,052,485 | Ogden | Aug. 25, 1936 |
| 2,141,119 | Wheeler | Dec. 20, 1938 |
| 2,356,699 | Rouan | Aug. 22, 1944 |
| 2,522,237 | Ryan | Sept. 12, 1950 |